United States Patent
Houck

[11] 3,767,329
[45] Oct. 23, 1973

[54] DEEP DRILLING MACHINE DEMOUNTABLE FOR HELICOPTER TRANSPORT

[75] Inventor: Theodore B. Houck, Tulsa, Okla.

[73] Assignee: Parker Drilling Company, Inc., Tulsa, Okla.

[22] Filed: Nov. 1, 1971

[21] Appl. No.: 194,182

[52] U.S. Cl. ............................... 417/360, 417/426
[51] Int. Cl. ...................... F04b 17/00, F04b 35/00
[58] Field of Search ................. 417/360, 5, 16, 426, 417/364, 34

[56] References Cited
UNITED STATES PATENTS

| | | | |
|---|---|---|---|
| 2,026,709 | 1/1936 | Sheldon | 417/426 |
| 3,364,871 | 1/1968 | Wilson | 417/539 X |
| 1,990,810 | 2/1935 | Young | 417/426 |
| 1,832,841 | 11/1931 | Sheldon | 417/426 |

*Primary Examiner*—Carlton R. Croyle
*Assistant Examiner*—Richard Sher
*Attorney*—Head & Johnson

[57] ABSTRACT

This invention is directed to a deep bore hole drilling machine which is designed for portability so that each part of the system can be broken down into subassembly units which are of less than 4,000 pounds total weight. Thus, the entire drilling system can be transported by helicopters which are capable of carrying a total weight of 4,000 pounds.

The critical design of such a system comes in two areas; namely, in the power compound and in the drawworks. One of the principle elements of the invention involves the use of only two speed changes in the drawworks with all other speed changes taking place at the high speed of the engine by means of four-speed, step-down, transmission units between the engine and the power compound. This gives great fixibility in speed control, but with reduced total weight due to the fact that at high speeds the multiple speed gearing can be taken care of with much lighter apparatus.

Four engines are used, each of which is tied to a drive subassembly, the four of which are coupled together to provide a total drive compound. Each drive subassembly includes an engine, a transmission, internal drive means for coupling all engines together. In three of the drive assemblies the engine shaft is connected through a clutch to a pump. Means are provided to divide the three pumps into two groups, one pump driven by one engine for one purpose, the other two remaining pumps driven by two or three engines for another purpose. Alternatively, all four engines can be coupled together to provide a power output from the compound which is the sum of all engine outputs.

The drawworks comprises a single output shaft, which carries the cable reel. There are two separate input shafts, which are normally coupled together to drive as a unit. Each input shaft carries a clutch and sprocket by means of which it can drive the output shaft at a selected speed. The output shaft forms a single transportable unit and the input shafts with their clutches each provide a separate transportable unit.

3 Claims, 5 Drawing Figures

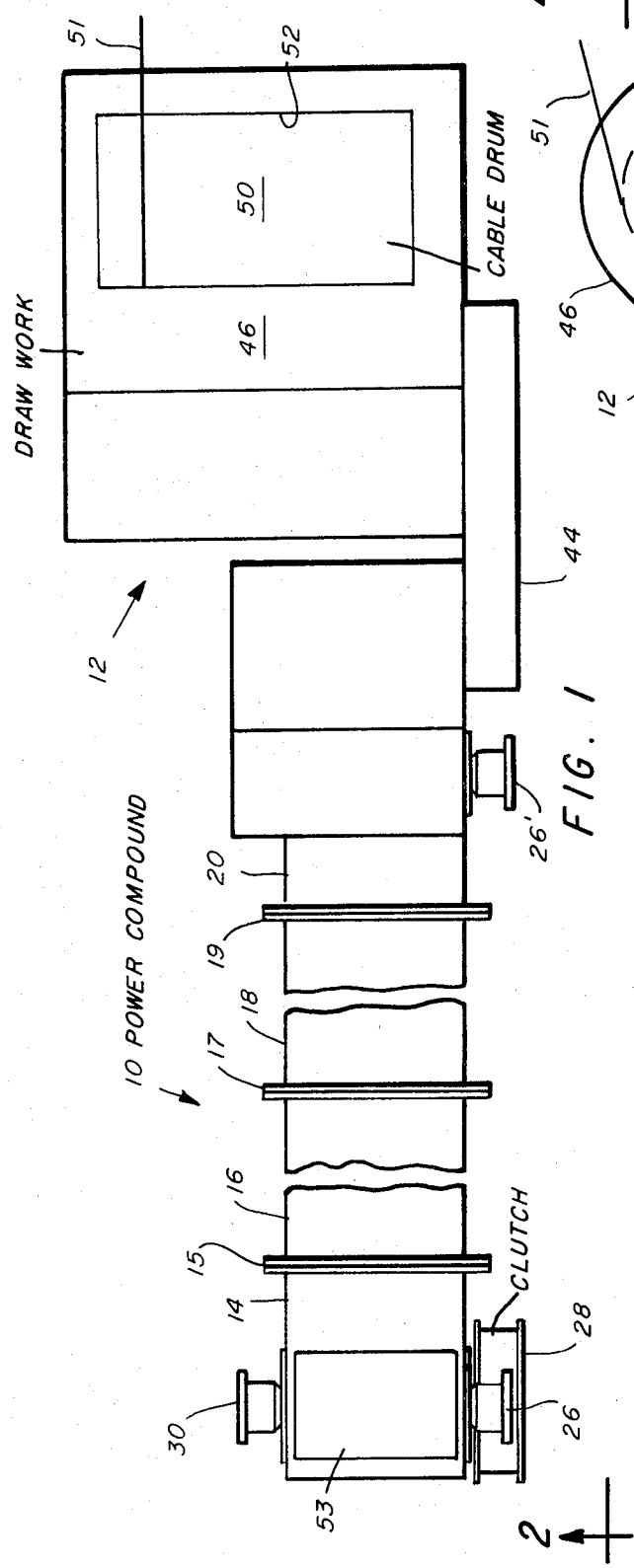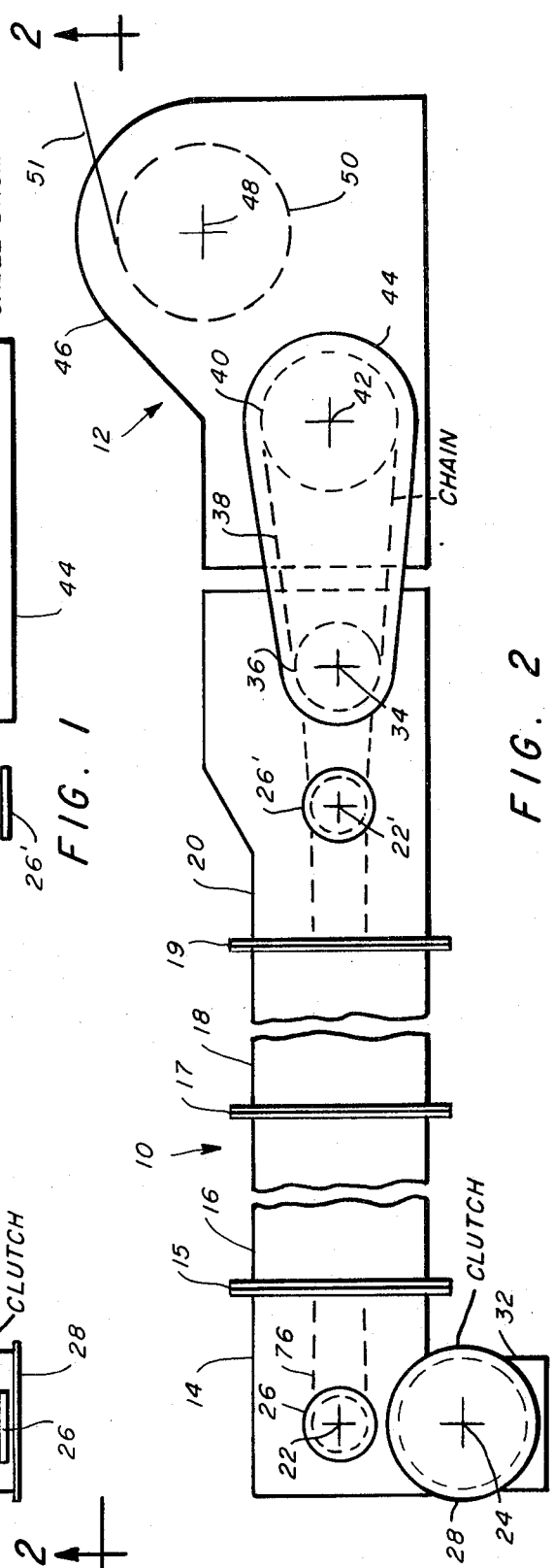

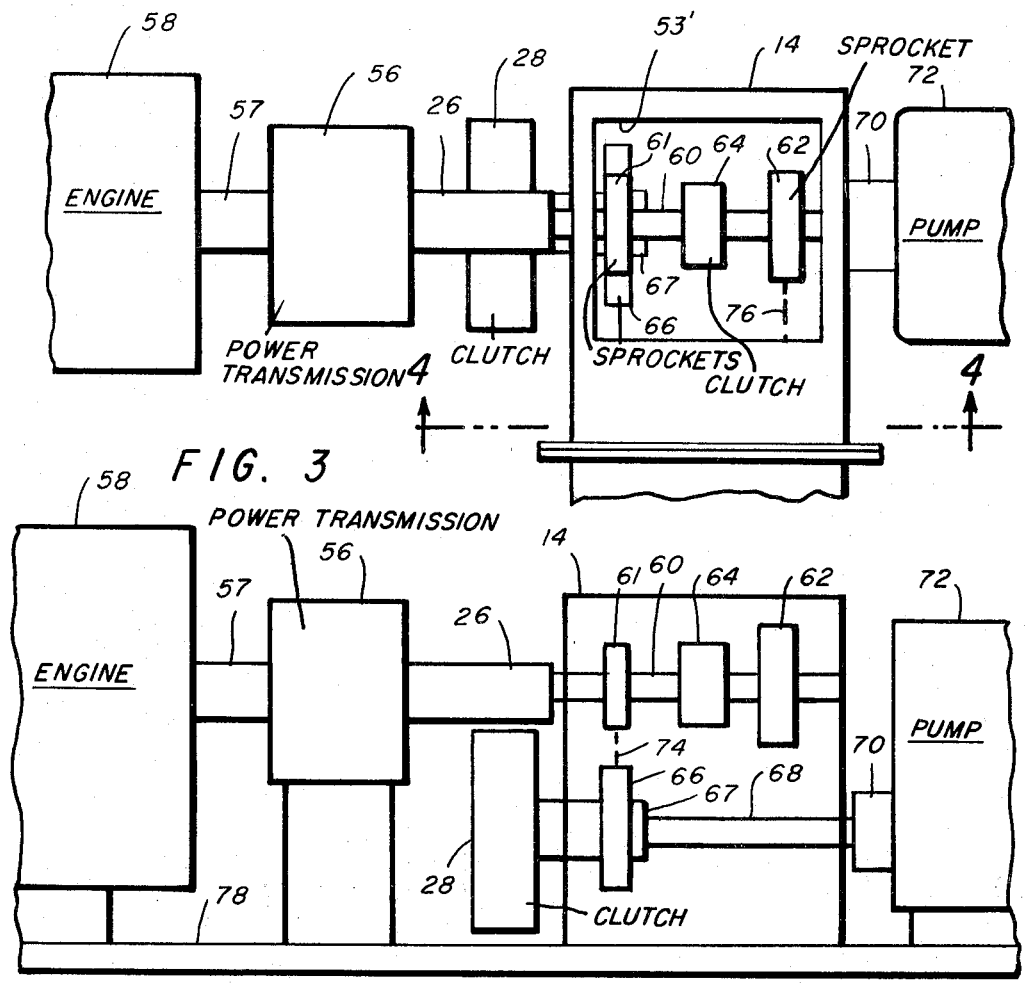
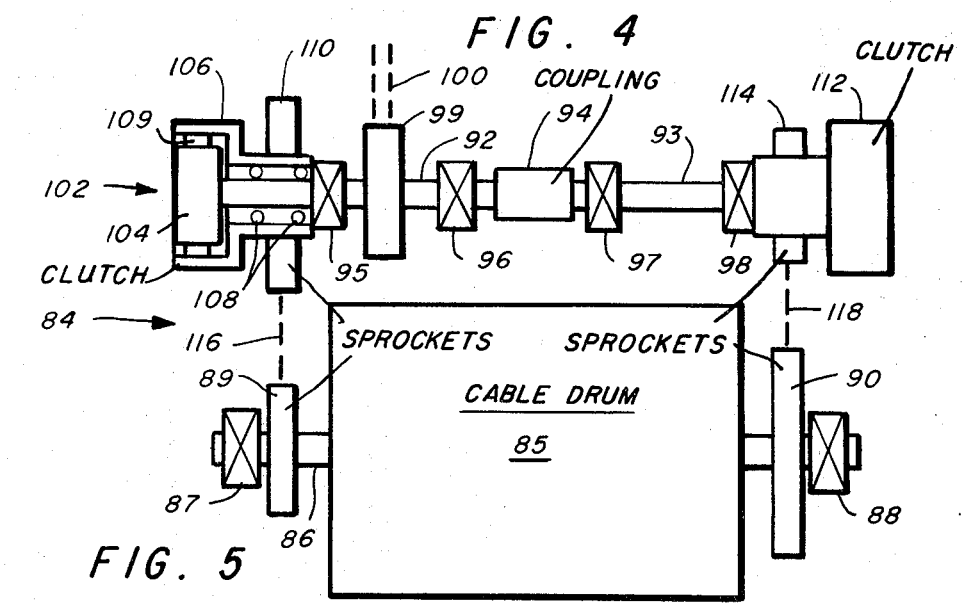

DEEP DRILLING MACHINE DEMOUNTABLE FOR HELICOPTER TRANSPORT

BACKGROUND OF THE INVENTION

This invention is in the field of deep bore hole drilling machines. More particularly, it is concerned with the drilling of oil wells to depths of the order of 8 to 25,000 feet. It is concerned, moreover, with a design of drilling apparatus which is demountable into many small subassemblies, each of which has a total weight of its own, of less than 4,000 pounds, so that it can be carried by a helicopter.

While it has been common in the area of small drilling machines, such as used for geophysical operations, to build these in separate, small units so that they could be transported easily by backpack or by pack mule into remote areas, it has never been practical heretofore to design a drilling rig which is required to drill to great depths, in the form of a demountable system with the limitations on each part to be under 4,000 pounds.

SUMMARY OF THE INVENTION

In studying the overall design of such a drilling system, it became clear that two of the most difficult parts of the drilling system to design on a demountable basis were the power compound and the drawworks. These will necessarily involve many parts and heavy pieces of equipment, such as engines, pumps, etc., and the heavy reel of cable and the drive shafts for the drawworks.

However, by designing the system so that the speed range could be taken care of at high (engine) speed, it now becomes practical to reduce the number of drive shafts and chains, in the drawworks, so that a single drum shaft and a single drive shaft, (which is demountable into two parts) was all that would be required in the drawworks. The additional speed changes needed are obtained in separate gear transmissions at each of the drive engines.

Each engine is coupled through a gear transmission to a drive subassembly, which incorporates a drive shaft and a pump shaft carrying a clutch with a chain drive between them. Thus, three of these subassemblies each provide a complete engine, speed change and pump system. Means are provided to have at least two separate pump systems; one including single pump and a single engine, and the other including two pumps and two or three engines. Alternatively, when pumping is not required, all four engines can be tied together to an output shaft to drive the drawworks.

It is an object of this invention to provide a simple, easily demountable drilling assembly which when assembled can be used for drilling bore holes to depths of the order to 8 to 25,000 feet, and which can be demountable into small units and subassemblies, each of which weighs less than 4,000 pounds.

BRIEF DESCRIPTION OF THE DRAWINGS

These and other objects and a better understanding of the principles of this invention will be evident from the following description taken in conjunction with the appended drawings, in which:

FIGS. 1 and 2 represent schematically in plan view and in elevation the power compound and the drawworks of the drilling system of this invention.

FIG. 3 represents schematically in plan view one of the power subassemblies.

FIG. 4 represents an elevation view of FIG. 3 taken along the line 4—4 of FIG. 3.

FIG. 5 represents schematically the drive system of the drawworks.

DESCRIPTION OF THE PREFERRED EMBODIMENT

Referring now to the drawings, and in particular to FIGS. 1 and 2, the numeral 10 indicates generally the power compound and the numeral 12 indicates generally the drawworks, both of which are drawn schematically.

The power compound is made up of a plurality of subassemblies such as 14, 16, and 18, each of which includes, as will be described more fully in connection with FIGS. 3 and 4, an engine, a transmission, a drive means inside a housing, a pump shaft, pump clutch, and pump.

The four engines are lined up on one side of the compound and three pumps on the other side. Means are provided for joining these subassemblies at junction flanges 15, 17, and 19, respectively. There are covers, such as 53, on the top of each of the subassemblies so that access is provided to the inside of the subassemblies and to the drive means therein located.

The coupling 26 is for the purpose of joining the transmission to the drive subassembly. Numeral 28 indicates the clutch in the drive to the pump, and numeral 30 indicates the coupling between the pump shaft and the pump, which is not shown. Coupling 26' on unit 20 does not have a corresponding pump. Normally, one engine will be driving the rotary table while three engines will be driving pumps in the mud line.

Means are provided for coupling together all of the engines and shafts, so that when maximum total power is required for the drawworks, all engines can be applied to that load.

The engine drives terminate at the output shaft 34 and a chain sprocket 36 which goes to drive the sprocket 40 on input shaft 42 of the drawworks. The shaft 42 also supplies power to the rotary table through means which are not shown in these figures. The output shaft 48 which carries the cable drum 50 and the cable 51 is driven by the input shaft 42 through means which will be described in connection with FIG. 5.

Numeral 44 indicates a chain guard over the chain 38 between the power compound and the drawworks. Numeral 46 indicates the housing of the drawworks.

Referring now to FIG. 3, there is shown represented by numeral 14 the same drive subassembly indicated in FIG. 1. The top cover plate 53 is removed disclosing through the opening 53' a shaft 60 with sprocket 61, clutch 64 and sprocket 62. Shaft 60 is coupled by means of coupling 26 to the power transmission 56 which provides four ratios of speed change downward from the input shaft at coupling 57 coming from the engine 58. Shown more clearly in FIG. 4, is the engine shaft 60 with sprocket 61 driving a sprocket 66 through chain 74. Sprocket 66 is mounted on clutch 67. The clutch mechanism 28 is extending to the outside of the subassembly housing 14.

The drive is from sprocket 61 through chain 74 to sprocket 66 through clutch 28 to pump shaft 68 to coupling 70 and then to the pump 72, all of which are shown schematically. Thus, the engine 58 can drive the pump 72 through four speeds by means of the clutch 28. The sprocket 62 on the drive shaft is shown driving chain 76 which drives horizontally to the corresponding drive shaft (not shown) in the adjacent drive subassembly 16, which also drives the subassembly 18, which also drives the subassembly 20. Thus, by means of the horizontal chains, such as 76, all of the engines driving shafts corresponding to shaft 60 can be coupled together to provide a single output shaft 34 and sprocket 26 carrying the total drive power of the four engines. The clutch 64 is a jaw clutch, which can be opened, and which will isolate the sprocket 62 and chain 76 from the shaft 60.

Referring now to FIG. 5 in which is shown in schematic fashion cable drum 85 supported on an output shaft 86 which is supported in bearings 87 and 88. Sprockets 89 and 90 are provided, one on each end of the drum shaft which, in conjunction with chains 116 and 118 and sprockets 110 and 114, respectively, can be driven from either shaft 92 or shaft 93 which are coupled together by coupling 94. The shafts 92 and 93 comprise the input shaft which, when it is coupled by coupling 94, and driven by chain 100 to sprocket 99 provides an input power from the sprocket 36 on shaft 34 of the power compound.

Each of the two shafts 92 and 93 are separately supported in bearings 95, 96 for shaft 92 and 97, 98 for shaft 93. The drive sprockets 110 and 114 are each supported on clutches 106 and 112, respectively. Thus, when power is on the sprocket 99 and the coupling 94 is in position closing either clutch 106 or 112 will drive the cable shaft 86 through sprocket 89 or 90, respectively, at a speed determined by the ratios of sprockets 110 to 89 or 114 to 90.

By making the input shaft in two pieces, the drawworks can be disassembled so that one component subassembly will be shaft 92 with sprocket 99, clutch 106, and sprocket 110, all of which will weigh less than the required maximum and similarly for shaft 93 and clutch 112.

The clutch 106 is shown in detail as comprising a portion 104 which is fastened directly to the drive shaft 92 and a portion 109 which is an expansible portion, which surrounds the portion 104 and drives between the outer surface of 104 to the inner surface of a surrounding drum 106 which is supported on shaft 92 by means of bearings of 108. Thus, when the expansion element 109 is relaxed, the shaft 92 can turn freely without the outer drum 106 moving. While it is supported from the shaft 92 it does not necessarily turn with it because of the bearings 108. Thus, with the system shown in FIG. 5, two speed changes can be provided between the input sprocket 99 and the drum shaft 86.

While the invention has been described with a certain degree of particularity, it is manifest that many changes may be made in the details of construction and the arrangement of components. It is understood that the invention is not to be limited to the specific embodiment set forth herein, by way of exemplifying the invention, but the invention is to be limited only by the scope of the attached claim or claims, including the full range of equivalency to which each element or step thereof is entitled.

What is claimed:

1. In a drilling apparatus for drilling small diameter bore holes deep into the earth, said apparatus designed for transportation purposes to be demountable into a plurality of subassemblies, each having a weight less than a specified magnitude, the improvement in power compound means, comprising:
  I. a plurality of separate similar drive subassemblies, each of said drive subassemblies comprising:
    a. housing means having structural and housing properties;
    b. engine means attached to said housing means on the outside, on a first side thereof;
    c. speed transmission means inside said housing operable at the high speed of said engine, said transmission means including drive means to provide a plurality of reduced output speeds to an output shaft extending from inside said housing;
    d. means to couple said engine to said transmission means inside said housing;
    e. pump means attached to said housing means on the outside on the second side thereof;
    f. means including clutch means to connect said pump means to said output shaft in said subassembly;
  II. means to connect a plurality of said housings of a plurality of said drive subassemblies into a structurally rigid self-contained single compound assembly housing without the use of a separate supporting framework; and
  III. means to connect a plurality of said output shafts in a plurality of said drive subassemblies in power additive relation to a single output drive means.

2. The drilling apparatus as in claim 1 including means to drive one pump with one engine while driving a remaining plurality of pumps with a remaining plurality of engines.

3. The drilling apparatus as in claim 2 in which said remaining plurality of pumps comprises two pumps and said remaining plurality of engines comprise three engines.

* * * * *